(12) United States Patent
Fanelli

(10) Patent No.: US 6,291,714 B1
(45) Date of Patent: Sep. 18, 2001

(54) CONTINUOUS PROCESS FOR EFFECTING GAS LIQUID REACTIONS

(75) Inventor: Pasquale Fanelli, Monza (IT)

(73) Assignee: Linde Aktiengesellschaft, Hollriegelskreuth (DE)

( * ) Notice: Subject to any disclaimer, the term of this patent is extended or adjusted under 35 U.S.C. 154(b) by 0 days.

(21) Appl. No.: 09/380,043

(22) PCT Filed: Feb. 4, 1998

(86) PCT No.: PCT/EP98/00592

§ 371 Date: Oct. 25, 1999

§ 102(e) Date: Oct. 25, 1999

(87) PCT Pub. No.: WO98/40414

PCT Pub. Date: Sep. 17, 1998

(30) Foreign Application Priority Data

Feb. 25, 1997 (EP) .................................................. 97830078

(51) Int. Cl.[7] .............................. C08F 2/00; B01J 19/24; C08G 65/26; C07C 213/00

(52) U.S. Cl. ........................... 564/475; 568/617; 568/618; 568/619; 568/678; 568/679

(58) Field of Search .............................. 564/475; 568/617, 568/618, 619, 678, 679

(56) References Cited

FOREIGN PATENT DOCUMENTS

| | | |
|---|---|---|
| 598283 | 5/1994 | (EP) . |
| 1226405 | 1/1991 | (IT) . |
| 1226406 | 1/1991 | (IT) . |

OTHER PUBLICATIONS

Database CAPLUS on STN, Acc. No. 1982:51806, Gonzalez et al., 'Continuous production of alkanolamines.' BR 8003904 (abstract).*

* cited by examiner

Primary Examiner—Johann Richter
Assistant Examiner—Brian J. Davis
(74) Attorney, Agent, or Firm—Millen, White, Zelano & Branigan, P.C.

(57) ABSTRACT

A continuous process for the production of polyadducts of alkylene oxide on a chain initiator with at least one active hydrogen comprises the step of: (a) providing n reaction units constituted by a tubular reactor (11), and a heat exchanger (14) downstream of the tubular reaction (11); (b) supplying the preheated chain initiator and the alkylene oxide to the reactor of the first reaction unit; (c) reacting the chain initiator with the alkylene oxide to obtain a first mixture; (d) cooling the first mixture by means of the heat exchanger (14); (e) supplying the reactor of the following reaction unit with the cooled mixture and with alkylene oxide; (f) repeating the procedure until the last reaction unit and then discharging the last mixture containing the desired product. The tubular reactors are vertical and the chain initiator and alkylene oxide are sprayed into the top of the reactor where a gas liquid reaction occurs.

21 Claims, 1 Drawing Sheet

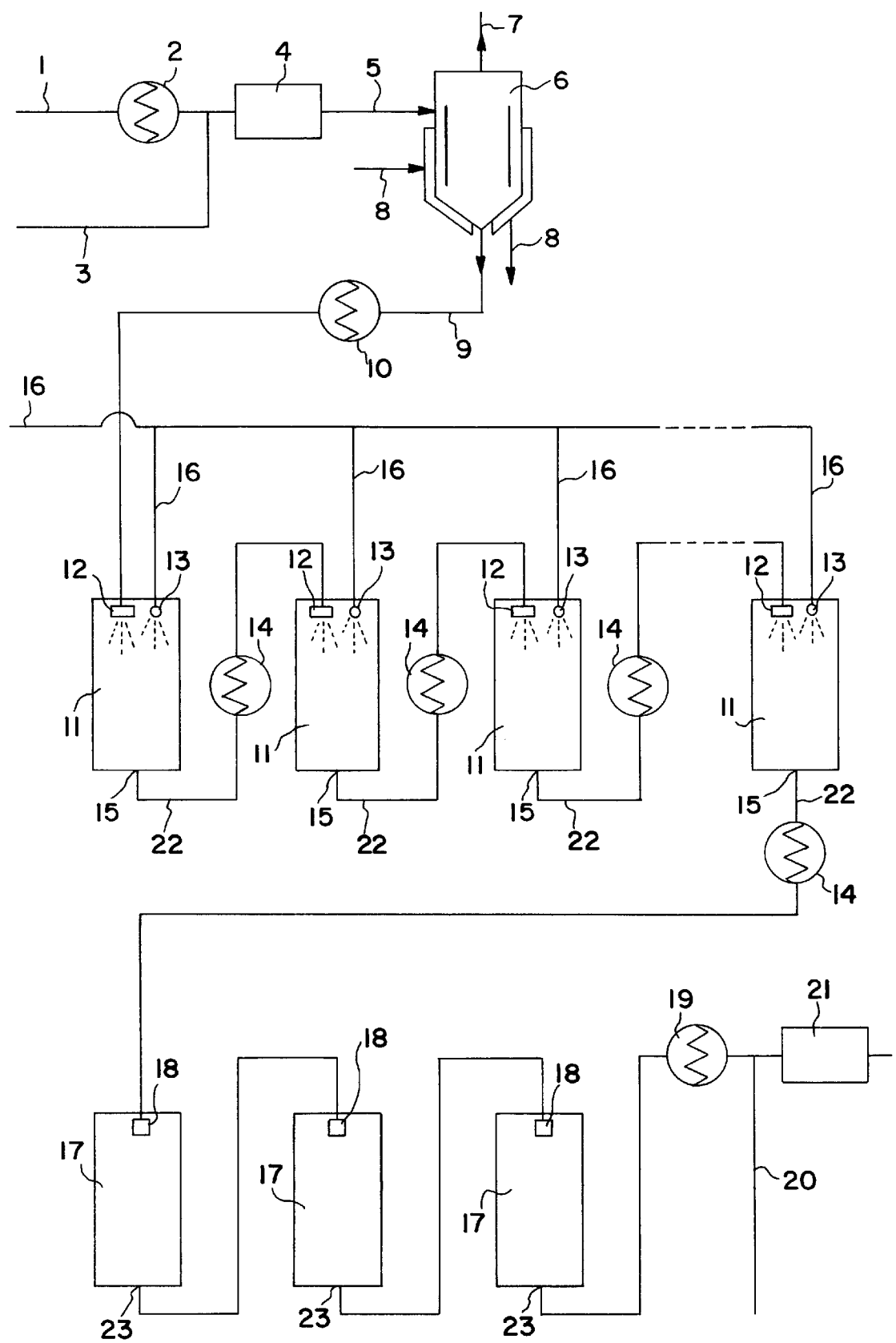

CONTINUOUS PROCESS FOR EFFECTING GAS LIQUID REACTIONS

This application is a 371 of PCT EP000592 filed Feb. 4, 1998.

The present invention relates to a process for effecting gas-liquid reactions which occur with a liquid-in-gas dispersion mechanism.

In particular, the present invention relates to a continuous process for the production of polyadducts of alkylene oxides, by a poly addition reaction on a chain initiator which has at least one active hydrogen.

These products, particularly the polyadducts of ethylene and propylene oxides, are used mainly as non-ionic surfactants and polyether-polyols.

Non-ionic surfactants are very widely used as wetting agents, dispersants, stabilisers, emulsifying agents and anti-emulsifying, anti-foaming and foaming agents and, in general, as auxiliary chemicals and functional fluids in the textile, paper, cellulose, pharmaceutical, food, cosmetic, paint, resin, mineral extraction and processing, advanced recovery and extraction of petroleum industries. In particular the use should be mentioned of non-ionic surfactants based on natural or synthetic fatty alcohols, as primary components in the formulation of household and industrial detergents and also of polyether-polyols as the main intermediates in the production of polyurethanes (rigid, semi-rigid, flexible foams, elastomers, adhesives, sealants, etc).

Italian Patent No. 1 226 405 describes a method for the production of polymerisation products of alkylene oxides starting from alkylene oxides, ethylene and/or propylene oxides being most commonly used, and compounds having an active or mobile hydrogen atom with suitable catalysts. The method of this patent uses a two-section reactor of which the upper is termed the gas-liquid reactor and the lower is an accumulation reservoir, disposed essentially horizontally. The gas-liquid reaction takes place in the upper section, the chain initiator being supplied from a plurality of spray heads on a central distributor while the lower body acts as a receiver and for recycling through a pump and an external heat exchanger, the reaction product coming from the upper section being resupplied to the latter to continue the polymerisation reaction.

The process described in the aforesaid patent, however, has several disadvantages. First of all, since it is dealing with a semi-continuous process, the productivity per unit time is considerably restricted by the need to discharge the contents of the reactor periodically.

As internal distributors are provided, the surface-volume ratio of the reactor used in this process is very high, thus increasing the probability of secondary reactions. The presence of internal distributors also creates dead spaces within the reactor which makes it difficult to drain and clean the reactor, thus increasing problems in changing production.

It should also be mentioned that the flow under gravity of the reaction product which collects in the upper horizontal section and is then ducted down into the lower one induces retrodiffusion and overexposure to the oxide atmosphere.

U.S. Pat. No. 4,261,922 describes a continuous process for obtaining polymerisation products of alkylene oxides starting from 1,2-alkylene oxides and a compound containing hydroxyl groups selected from the group comprising water and mono-, di-, tri- and poly-aliphatic alcohols. This process is carried out with the use of a coil reactor having a length of at least 1.2 m immersed in a suitable heat-exchange fluid. A mixture of the hydroxyl compound and an alkaline catalyst is introduced continuously into the reactor and is brought into contact with the 1,2-alkylene oxide metered from a plurality of devices located along the entire length of the reactor. In order to optimise the reaction kinetics, the metering devices are located at intervals such as to ensure the optimum concentration of unreacted oxide at every point.

The processes carried out in such a reactor, however, have the great disadvantage of being extremely rigid, as it allows absolutely no variations in the reaction parameters, such as, the temperature, the type of chain initiator, etc. Every time there is, in fact, a variation, it is necessary to readjust the positions of the metering devices along the entire coil, as a result of the change in the concentration of unreacted oxide that occurs exactly because of this variation. It should also be mentioned that, whenever the rate of the polymerisation reaction in the initiation phase differs from that during the propagation phase, the metering devices cannot be positioned at regular intervals along the reactor; a change in the process parameters thus requires the separate readjustment of every one of them.

The problem at the basis of the invention is thus to provide a process for the production of polyadducts of alkylene oxides which can be used with any chain initiator, catalyst and alkylene oxide and which is also able to overcome the aforesaid problems.

SUMMARY OF THE INVENTION

The problem is solved according to the invention by a continuous process for the production of polyadducts of alkylene oxide on a chain initiator which has at least one active hydrogen, characterised in that it comprises the steps of;

a) providing n reaction units, where n is a whole number from 2 to 100, each constituted by a tubular reactor which is substantially vertical and has an upper part and a lower part, and a heat exchanger downstream of the tubular reactor, the tubular reactor having at least one first supply device for supplying the alkylene oxide, at least one second supply device and an outlet aperture, the devices being located on the inner surface of the upper part of tubular reactor;

b) supplying the reactor of a first of the n reaction units with the chain initiator, preheated to a predetermined temperature, through the at least one second supply device and with the alkylene oxide through the at least one first supply device;

c) reacting the chain initiator with the alkylene oxide to obtain a first liquid mixture containing an intermediate product;

d) cooling the first liquid mixture by means of the heat exchanger;

e) supplying the reactor of a second of the n reaction units with the first liquid mixture by means of the at least one second supply device and with the alkylene oxide by means of the at least one first supply device;

f) reacting the first liquid mixture with the oxide to obtain a second liquid mixture;

g) repeating the steps d), e) and f) in each of the remaining n-2 reaction units to obtain an nth liquid mixture containing the desired product;

i) cooling and discharging the nth liquid mixture containing the desired product.

The expression "tubular" is intended to include any type of elongate body with a section of any shape and dimensions. This expression further includes reactors with two different diameters, with a conical end and mushroom reactors.

The chain initiators which may be used for the process of the present invention are compounds having at least one active hydrogen, according to the final product it is desired to obtain; examples of such chain initiators may be found among the alkylphenols, such as octylphenol, nonylphenol, dodecylphenol, dinonylphenol, tristyrylphenol; natural and synthetic fatty alcohols and mixtures thereof, such as decyl alcohol, tridecyl alcohol, oleyl alcohol, oleylacetyl alcohol, cetylstearyl alcohol, lanolin, cholesterol, acetylene diol; fatty amines and hydrogenated amines, such as laurylamine, oleylamine, cocoamine, tallow amine and soya amine, tallow iminopropylenamine, abietylamine; fatty amides, such as laurylamide, stearyl amide, fatty amides derived from coconut oil, soya and tallow; fatty acids such as coconut, lauric, tallow, stearic, palmitic, oleic, myristic, linoleic, abietic and naphthenic acids; sorbitan esters such as the monolaurate, monopalmitate, monostearate, mono-oleate, monoabietate, dilaurate, tristearate, trioleate, pentalaurate, hexaoleate, hexastearate; monoglycerides and monostearates of, for example, of coconut and glycerol; pentaerythritol esters, such as the monolaurate, mono-oleate and of lanolin; ethylene glycols, such as mono-, di-, tri-ethylene glycols and polyethylene glycols; propylene glycols, such as mono-, di-, tri-propylene glycols and polypropylene glycols; ethylene oxide/propylene oxide block polymers and random sequences thereof based on various chain initiators, such as fatty amines, fatty alcohols, glycerol, dipropylene glycol etc; oils such as castor-oil, hydrogenated castor-oil, mink oil, tallow and tall oil; mercaptans such as dodecyl mercaptan.

The process of the present invention is preferably carried out with the use of an alkylene oxide selected from the group comprising ethylene oxide, propylene oxide, butylene oxide and their mixtures.

In order to activate the alkoxylation reaction, to speed it up and, whenever necessary, the chain initiator is mixed with a catalyst in a mixing unit upstream of the reaction unit. In a particularly advantageous embodiment, the catalyst is selected from the group comprising hydroxides and alcoholates of alkali metals and hydroxides of alkaline-earth metals. Acidic catalysts may however also be chosen even though they are not preferred since they have the disadvantage of increasing the concentration of dioxan in the product. The catalyst may be added either in the solid phase or in aqueous solution.

To advantage the chain initiator and the catalyst are subjected to a drying step in a unit located upstream of a first of the n reaction units and downstream of the mixing unit in order to remove the water of formation of the alcoholate, the water in which the catalyst is dissolved and any moisture present in the chain initiator. For this purpose a falling-film evaporator is used which may be depressurised to various degrees of vacuum to accelerate the removal of the water. In this evaporator the mixture to be dried is made to flow in the form of a thin film along the heated walls thereof, thus obtaining a high exchange of material and energy. The process of the invention does not however exclude the use of other conventional evaporators.

In a preferred embodiment, there are fifteen reaction units divided into three groups of five units arranged in cascade. Preferably by-pass ducts are also provided for one or more reaction units, starting from the last, whenever the type of reaction to be carried out requires a shorter overall residence time in the reactors.

In a particularly advantageous embodiment of the process of the present invention, the nth liquid mixture is subjected to a step in which its free alkylene oxide content is lowered. For this purpose one or more cylindrical reactors are provided, each arranged with its longitudinal axis substantially vertical and each having a supply device for supply of the liquid mixture and an outlet aperture. In this one or more reactors, the alkylene oxide and the chain initiator, which may still be present in the mixture, are reacted until the free oxide content of the mixture containing the reaction product has been reduced to at most 1 ppm. The liquid which flows through the reactor(s) must be kept as calm as possible to avoid retrodiffusion. Thus a homogeneous residence time is obtained, ensuring almost total consumption of the free alkylene oxide.

In a particularly advantageous embodiment of the process of present invention, the step of lowering the free alkylene oxide content in the reaction product is carried out in three reactors in cascade.

Preferably the devices for supplying the alkylene oxide and the chain initiator to the reaction units are atomisers, each comprising a hollow, substantially frusto-conical body projecting inwardly from the wall of the reactor from a larger diameter end thereof at which the atomisers are in fluid communication with respective ducts for supplying the reaction mixture and the alkylene oxide, a plurality of nozzles being formed in the hollow body which are homogenously distributed over the surface thereof.

It should be stressed that the frusto-conical shape of the atomisers enables the nozzles to be oriented in the reactor so that they supply the atomised liquid over a wide conic angle.

Alternatively entirely conventional device such as Venturi nozzles or other nozzles, may be used to supply and distribute the alkylene oxide and chain initiator.

The process of the invention can be carried out continuously, thus increasing the overall productivity of the plant and considerably simplifying maintenance, cleaning etc.

The process of the present invention also enables the reaction to be carried out with greater safety in that the overall volume occupied by the free alkylene oxide during the reaction is considerably less than that in the prior art. As the oxide is fed in small quantities along the entire reaction path, a good proportion thereof is consumed immediately, the concentration of free oxide along the reaction path remaining constant at a relatively low level. By virtue of the post-reaction step in which the free oxide content of the final product is, in any case, reduced to very low levels, the environmental impact of the entire process is also improved considerably, enabling typical degassing operations at the end of batch productions to be omitted.

As the process is continuous, the quality of the product is also improved by virtue of the absence of cross-contaminations due to production changes in batch reactions.

The process of the invention can be carried out with a wide range of chain initiators and may readily be adapted to any type of kinetics and any type of product enabling the optimum quality to be obtained in all cases.

This is made possible by the fact that the residence time in each reactor may easily be varied by control of the liquid level therein by suitable computer means. With the process of the present invention it is also possible to control the overall residence time by excluding one or more reaction units by means of suitable by-passes.

In a further aspect thereof, the present invention provides a continuous process for the production of polyadducts of alkylene oxide on a chain initiator which has at least one active hydrogen, characterised in that it includes the steps of:

a) providing a reaction unit constituted by a substantially vertical tubular reactor having an upper part and a lower part and a heat exchanger downstream of the tubular reactor, the tubular reactor having at least one first supply device for supplying the alkylene oxide, at least one second supply device and an outlet aperture, the supply devices being located on the inner surface of the upper part of the tubular reactor;

b) supplying the reactor of the reaction unit with the chain initiator, preheated to a predetermined temperature, by means of the at least one second supply device and with the alkylene oxide through the at least one first supply device;

c) reacting the chain initiator with the alkylene oxide to obtain a liquid mixture containing the desired product;

d) cooling the liquid mixture by means of the heat exchanger.

In yet a further aspect, the present invention provides a continuous process for the production of alkanolamine starting from ammonia and ethylene oxide or propylene oxide, characterised in that it includes the steps of:

a) providing n reaction units, where n is whole number from 2 to 100, each constituted by a substantially vertical tubular reactor having an upper part and a lower part and a heat exchanger downstream of the tubular reactor, the tubular reactor having at least one first supply device for supplying the ethylene oxide, at least one second supply device and an outlet aperture, the supply devices being located on the inner surface of the upper part of the tubular reactor;

b) supplying the reactor of a first of the n reaction units with ammonia, preheated to a predetermined temperature, by means of the at least one second supply device and with the alkylene oxide through the at least one first supply device;

c) reacting the ammonia with the ethylene oxide to obtain a first liquid mixture containing an intermediate product;

d) cooling the first liquid mixture by means of the heat exchanger;

e) supplying the reactor of a second of the n reaction units with the first liquid mixture through the at least one second supply device and with the ethylene oxide through the at least one first supply device;

f) reacting the first liquid mixture with the oxide to obtain a second liquid mixture;

g) repeating steps d),e) and f) in each of the remaining n-2 reaction units to obtain an nth liquid mixture containing the desired product;

i) cooling and discharging the nth liquid mixture containing the desired product.

In yet a further aspect, the present invention provides a continuous process for the production of glycol ether from ethylene oxide and an alcohol, ROH, in which R is a $C_1$–$C_4$ alkyl group, characterised in that it includes the steps of;

a) providing n reaction units, where n is whole number from 2 to 100, each constituted by a substantially tubular vertical reactor having an upper part and a lower part and a heat exchanger downstream of the tubular reactor, the tubular reactor having at least one first supply device for supplying the ethylene oxide, at least one second supply device and an outlet aperture, the supply devices being located on the inner surface of the upper part of the tubular reactor;

b) supplying the reactor of a first of the n reaction units with the alcohol, preheated to a predetermined temperature, by means of the at least one second supply device and with the ethylene oxide through the at least one first supply device;

c) reacting the alcohol with the ethylene oxide to obtain a first liquid mixture containing an intermediate product;

d) cooling the first liquid mixture by means of the heat exchanger;

e) supplying the reactor of a second of the n reaction units with the first liquid mixture through the at least one second supply device and with the ethylene oxide through the at least one first supply device;

f) reacting the first liquid mixture with the oxide to obtain a second liquid mixture;

g) repeating steps d),e) and f) in each of the remaining n-2 reaction units to obtain an nth liquid mixture containing the desired product;

i) cooling and discharging the nth liquid mixture containing the desired product.

BRIEF DESCRIPTION OF THE DRAWINGS

In order to provide a better understanding, a preferred embodiment of the invention will now be described, purely by way of non-limitative example, the embodiment being shown schematically in the appended drawing.

DETAILED DESCRIPTION OF THE DRAWINGS

With reference to the said drawing, a chain initiator is taken continuously from a storage container (not shown) and made to flow through a duct 1, through a heat exchanger 2, supplied continuously with steam, whereby it is preheated to the reaction temperature. Alternatively the exchanger 2 may be supplied with a diathermic fluid or with pressurised water.

A catalyst for the reaction is introduced in desired quantities downstream of the heat exchanger 2 through a duct 3 and is suitably mixed with the chain initiator in a static mixer 4.

The heated chain initiator and catalyst are then conveyed through a duct 5 into a drying unit 6 in which the water of formation of the alcohol, the water in which the catalyst is dissolved and any moisture in the chain initiator are removed through a line 7. The drying unit 6 is a falling-film evaporator which can be evacuated and the walls of which are heated by means of a fluid supplied from a duct 8. Alternatively conventional drying units may be used instead of the falling-film evaporator.

The dried, catalysed chain initiator is then conveyed through a duct 9 to a heat exchanger 10 where the desired reaction temperature is restored. The heat exchanger 10 is supplied with steam but may also be supplied with diathermic oil, pressurised water or other conventional heat-exchange fluids.

The dried, catalysed initiator, heated to the reaction temperature, is then brought into contact with the alkylene oxide. For this purpose, a plurality of reaction units is used, in this embodiment three groups of five units each, the first three and the last of these reaction units being shown in the drawing, and each reaction unit comprises a reactor 11 and a heat exchanger 14 located downstream of the reactor 11. Each reactor is tubular and arranged with its longitudinal axis vertical and includes an upper part and a lower part. The dried, catalysed chain initiator coming from the heat exchanger 10 is supplied to the reactor 11 of the first reaction unit through a plurality of atomisers 12, in the example one, located at the apex of the reactor 11, and comes into intimate contact with the alkylene oxide supplied and atomised through a duct 16 and a plurality of atomisers 13, in the example one, also at the apex of the reactor 11. The alkylene oxide is added under automatic control of its mass flow rate and reaction pressure. This initiates the absorption of the oxide by the droplets of catalysed chain initiator in the upper part of the reactor 11 and hence the chemical reaction in the lower part.

In fact the droplets, saturated with alkylene oxide, coalesce on the free surface of the liquid phase in the reactor 11 where the alkoxylation reaction takes place. The liquid phase, after a suitable residence time, is discharged through an aperture 15, pumped through the heat exchanger 14 so as to yield up the heat acquired from the exothermic reaction, and is introduced through a duct 22 and by means of atomisers 12 into the reactor 11 of the second reaction unit. The cycle is then repeated in the other fourteen reaction units, a well defined molecular growth being achieved downstream of each reaction unit.

Whenever only some of the reactors available are used in order to reduce the overall residence time, and hence the overall degree of molecular growth, it is possible to exclude one or more reaction units, starting from the last and working back, by means of by-pass ducts not shown.

The alkoxylation reaction occurs with a residence time which is held rigorously constant by automatic control of the level of liquid in the reactor 11. As the mass flow rate of the alkylene oxide and the chain initiator leaving the bottom of the reactor 11 is fixed, the mass flow rate of the reaction product leaving each reactor 11 is constant.

When the reaction is finished, the reaction mixture is subjected to a step in which its free alkylene oxide content is lowered. For this purpose, the flow leaving the reactor 11 of the last reaction unit in use is conveyed into the first of a plurality of reactors 17 arranged in cascade, there being three in the example shown, these reactors being tubular and arranged with their longitudinal axes substantially vertical, and each having a supply device 18 for the supply of the reaction mixture coming from the preceding reactor and an outlet aperture 23.

By-pass ducts are again provided for whenever it is wished to exclude one or more reactors 17 to reduce the overall residence time.

Once the alkylene oxide content has been lowered to a predetermined value, the product is cooled to the discharge temperature by means of a heat exchanger 19. If necessary, the product is finally neutralised by mixing in a static mixer 21 with an acid metered through a duct 20.

As the process of the invention is continuous, the heat of the alkoxylation reaction yielded up to the heat exchangers 14 may be recovered to generate low-pressure steam, to heat pressurised water or to effect heat recovery by preheating the chain initiator.

EXAMPLE 1

Production of 2500 kg/h of $C_{12}$–$C_{14}$ fatty alcohol+1.8 moles of ethylene oxide In the plant described above, 1777 kg/h of fatty alcohol (mw 195) where heated to 140° C., mixed with 7.5 kg/h of 50% KOH solution and dried in the unit 6 under a vacuum of 5 mbar. The catalysed, dried chain initiator was first heated in line to 160° C. and then supplied to the first reactor 11, the first ten of the fifteen reaction units being activated for the alkoxylation reaction.

Each reactor is characterised by an S/V ratio of 15.5 $m^{-1}$, a reaction pressure of 6 bar and a reaction temperature of 160° C.

72.3 kg/h of ethylene oxide were supplied to the reactor 11 of the first reaction unit and reacted with the chain initiator to give a reaction product which was discharged after a residence time of about 3 minutes and supplied to the reactor 11 of the second reaction unit after it had been cooled by means of the heat exchanger 14 to the reaction temperature of 160° C.

The above was repeated for each reaction unit and the product was discharged from the final one into the first of the three reactors 17 so that the remaining oxide could be consumed. The overall residence time in the three reactors 17 was 30 minutes.

The product was finally cooled to 60° C., neutralised with 8 kg/h of glacial acetic acid and finally discharged.

The quality of the resulting product was as follows:

| | |
|---|---|
| Appearance (25° C.) | Limpid liquid |
| Colour, APHA | 5 max |
| Water (ppm) | 0.1 max |
| pH (3% aqueous sol., 25° C.) | 6–7 |
| Hydroxyl no (mg KOH/g) | 204.5 +/– 2.0 |
| Polyethylene glycol (% weight) | 0.50 max |
| Dioxan (ppm) | 1 max |
| Free ethylene oxide | 1 max |

EXAMPLE 2

Production of 2500 kg/h of $C_{12}$–$C_{14}$ fatty alcohol+2.8 moles of ethylene oxide 1531 kg/h of fatty alcohol (MW 195) were heated to 140° C., mixed with 7.5 kg/h of 50% KOH solution dried in the unit 6 at a vacuum of 5 mbar. The catalysed dried chain initiator was first heated in line to 160° C. and then supplied to the reactor 11 of the first reaction unit, the first fourteen reaction units being activated for the alkoxylation reaction.

Each reactor is characterised by an S/V ratio of 15.5 $m^{-1}$, a reaction pressure of 6 bar and a reaction temperature of 160° C.

The first reaction unit was supplied with 69.2 kg/h of ethylene oxide which reacted with the chain initiator to give a reaction product which was discharged after a residence time of about 3 minutes and supplied to the reactor of the second reaction unit after it had been cooled by means of the heat exchanger 14 to the reaction temperature of 160° C.

The above was repeated for each reaction unit and the product was discharged from the final unit into the first of the three reactors 17 for the residual oxide to be consumed. The overall residence time in the three reactors 17 was 30 minutes.

The product was finally cooled to 60° C., neutralised with 8 kg/h of a glacial acetic acid and finally discharged. The quality of the product was as follows:

| | |
|---|---|
| Appearance (25° C.) | Limpid liquid |
| Colour, APHA | 5 max |
| Water (ppm) | 0.1 max |
| pH (3% aqueous sol., 25° C.) | 6–7 |
| Hydroxyl no (mg KOH/g) | 176.0 +/– 2.0 |
| Polyethylene glycol (% weight) | 0.50 max |
| Dioxan (ppm) | 1 max |
| Free ethylene oxide | 1 max |

What is claimed is:

1. A continuous process for the production of polyadducts of alkylene oxide on a chain initiator which has at least one active hydrogen, comprising the steps of;

a) providing n reaction units, where n is a whole number from 2 to 100, each constituted by a tubular reactor (11), which is substantially vertical and has an upper part and a liquid-containing lower part, and a heat exchanger (14) downstream of the tubular reactor (11), the tubular reactor (11) having at least one first supply device (13) for supplying the alkylene oxide, at least one second supply device (12) and an outlet aperture (15), the devices (12),(13) being located on the inner surface of the upper part of tubular reactor (11) and above the liquid in the lower part;

b) spraying the chain initiator into the reactor (11) of a first of the n reaction units through the at least one second supply device (12) and the alkylene oxide through the at least one first supply device (13) so as to permit the alkylene oxide to be absorbed by droplets of chain initiator;

c) reacting the droplets of the chain initiator absorbed with the alkylene oxide to obtain a first liquid mixture containing an intermediate product;

d) cooling the first liquid mixture;

e) spraying the resultant cooled first liquid mixture into the reactor of a second of the n reaction units by means of the at least one second supply device (12) and the alkylene oxide by means of the at least one first supply device (13);

f) reacting the first liquid mixture with the oxide to obtain a second liquid mixture;

g) repeating the steps d), e) and f) in each of the remaining n-2 reaction units to obtain an nth liquid mixture containing the desired product; and h) cooling and discharging the nth liquid mixture containing the desired product.

2. A process according to claim 1, in which the chain initiator is mixed with an alkoxylation catalyst in a mixing unit (4) located upstream of the first reaction unit to obtain a catalysed chain initiator.

3. A process according to claim 2, in which the catalysed chain initiator is dried in a unit (6) upstream of the first reaction unit and downstream of the mixing unit (4).

4. A process according to claim 3, in which the drying unit (6) is a falling-film evaporator.

5. A process according to claim 1, in which there are fifteen reaction units divided into three groups of five.

6. A process according to claim 1, in which the nth liquid mixture containing the desired product is subjected to a step in which its free alkylene oxide content is lowered and to a neutralising step.

7. A process according to claim 6, in which the step in which the free alkylene oxide content is lowered is carried out in one or more cylindrical reactors (17) arranged with their axes substantially vertical, the said one or more reactors (17) being provided with a supply device (18) for the supply of the nth liquid mixture and an outlet aperture (23).

8. A process according to claim 7, in which the said one or more reactors (17) are constituted by three reactors in cascade.

9. A process according to claim 1, in which the alkylene oxide is selected from the group consisting of ethylene, propylene oxide oxide, butylene oxide and mixtures thereof.

10. A process according to claim 1, in which the chain initiator is selected from the group consisting of alkylphenols, natural and synthetic fatty alcohols and their mixtures, fatty amines and hydrogenated amines, fatty amides, fatty acids, sorbitan esters, monoglycerides and monostearates, pentaerythritol esters, ethylene glycols, propylene glycols, block polymers made from ethylene oxide/propylene oxide, and polymers obtained from random sequences of the latter based on various chain initiators selected from the group consisting of fatty amines, fatty alcohols, glycerine, dipropylene glycol, castor-oil, hydrogenated castor-oil, tallow, mink oil, tall oil and mercaptans.

11. A process according to claim 2, in which the catalyst is selected from the group consisting of hydroxides and alcoholates of alkali metals and hydroxides of alkaline-earth metals.

12. A process according to claim 1, in which the supply devices (12), (13) are atomisers comprising a substantially frusto-conical hollow body projecting inwardly from the wall of the reactor from a larger-diameter end at which the atomisers (12), (13) are in fluid communication with respective ducts (22, 16) for supplying the reaction mixture and the alkylene oxide, a plurality of nozzles being formed in the hollow body and homogenously distributed over the surface thereof.

13. A continuous process for the production of polyadducts of alkylene oxide on a chain initiator which has at least one active hydrogen, comprising:

a) providing a reaction unit constituted by a substantially vertical tubular reactor (11) having an upper part and a liquid-containing lower part and a heat exchanger (14) downstream of the tubular reactor (11), the tubular reactor (11) having at least one first supply device (13) for supplying the alkylene oxide, at least one second supply device (12) and an outlet aperture (15), the supply devices (12), (13) being located on the inner surface of the upper part of the tubular reactor (11) and above the liquid in the lower part of the tubular reactor;

b) spraying into the reactor (11) of the reaction unit the chain initiator, preheated to a predetermined temperature, by means of the at least one second supply device (12) and the alkylene oxide through the at least one first supply device (13) so as to permit alkylene oxide to be absorbed by droplets of said chain initiator;

c) permitting the resultant droplets to drop onto the liquid in the lower part of the reactor and reacting the droplets of the chain initiator absorbed the alkylene oxide to obtain a liquid mixture containing the desired product;

d) cooling and discharging the liquid mixture by means of the heat exchanger (14).

14. A continuous process for the production of alkanolamine starting from ammonia and ethylene oxide or propylene oxide, comprising:

a) providing n reaction units, where n is whole number from 2 to 100, each constituted by a substantially vertical tubular reactor (11) having an upper part and liquid-containing a lower part and a heat exchanger (14) downstream of the tubular reactor, the tubular reactor (11) having at least one first supply device (13) for supplying the ethylene oxide, at least one second supply device (12) and an outlet aperture (15), the supply devices (12), (13) being located on the inner surface of the upper part of the tubular reactor (11) and above the liquid;

b) spraying into the reactor (11) of a first of the n reaction units ammonia, preheated to a predetermined temperature by means of the at least one second supply device (12) and the alkylene oxide through the at least one first supply device (13);

c) reacting the ammonia with the ethylene oxide to obtain a first liquid mixture containing an intermediate product;

d) cooling the first liquid mixture by means of the heat exchanger (14);

e) spraying into the reactor (11) of a second of the n reaction units the first liquid mixture through the at least one second supply device (12) and the ethylene oxide through the at least one first supply device (13) so as permit ethylene oxide to be absorbed by droplets of the first liquid mixture;

f) permitting the droplets to drop onto the liquid in the lower part of the reactor and reacting the first liquid mixture with the oxide to obtain a second liquid mixture;

g) repeating step d), e) and f) in each of the remaining n-2 reaction units to obtain an nth liquid mixture containing the desired product; and h) cooling and discharging the nth liquid mixture containing the desired product.

15. A continuous process for the production of glycol ether from ethylene oxide and an alcohol, ROH, in which R is a $C_1C_4$ alkyl group, comprising;

a) providing n reaction units, where n is whole number from 2 to 100, each constituted by a substantially vertical tubular reactor (11) having an upper part and a lower part and a heat exchanger (14) downstream of the tubular reactor, the tubular reactor (11) having at least one first supply device (13) for supplying the ethylene oxide, at least one second supply device (12) and an outlet aperture (15), the supply devices (12), (13) being located on the inner surface of the upper part of the tubular reactor (11);

b) supplying the reactor (11) of a first of the n reaction units with the alcohol, preheated to a predetermined temperature, by means of the at least one second supply device (12) and with the ethylene oxide through the at least one first supply device (13);

c) reacting the alcohol with the ethylene oxide to obtain a first liquid mixture containing an intermediate product;

d) cooling the first liquid mixture by means of the heat exchanger (14);

e) supplying the reactor (11) of a second of the n reaction units with the first liquid mixture through the at least one second supply device (12) and with the ethylene oxide through the at least one first supply device (13);

f) reacting the first liquid mixture with the oxide to obtain a second liquid mixture;

g) repeating step d), e) and f) in each of the remaining n-2 reaction units to obtain an nth liquid mixture containing the desired product; and h) cooling and discharging the nth liquid mixture containing the desired product.

16. A continuous process for the production of polyadducts of alkylene oxide on a chain initiator which has at least one active hydrogen, characterized in that it comprises the steps of;

a) providing n reaction units, where n is a whole number from 2 to 100, each constituted by a tubular reactor (11), which is substantially vertical and has an upper part and a lower part, and a heat exchanger (14) downstream of the tubular reactor (11), the tubular reactor (11) having at least one first supply device (13) for supplying the alkylene oxide, at least one second supply device (12) and an outlet aperture (15), the devices (12), (13) being located on the inner surface of the upper part of tubular reactor (11);

b) supplying the reactor (11) of a first of the n reaction units with the chain initiator, preheated to a predetermined temperature, through the at least one second supply device (12) and with the alkylene oxide through the at least one first supply device (13);

c) reacting the chain initiator with the alkylene oxide to obtain a first liquid mixture containing an intermediate product;

d) cooling the first liquid mixture by means of the heat exchanger (14);

e) supplying the reactor of a second of the n reaction units with the first liquid mixture by means of the at least one second supply device (12) and with the alkylene oxide by means of the at least one first supply device (13);

f) reacting the first liquid mixture with the oxide to obtain a second liquid mixture;

g) repeating the steps d), e) and f) in each of the remaining n-2 reaction units to obtain an nth mixture containing the desired product;

h) cooling and discharging the nth liquid mixture containing the desired product, wherein the nth liquid mixture containing the desired product is subjected to a step in which its free alkylene oxide content is lowered and to a neutralising step.

17. A process according to claim 16, in which the step in which the free alkylene oxide content is lowered is carried out in one or more cylindrical reactors (17) arranged with their axes substantially vertical, the said one or more reactors (17) being provided with a supply device (18) for the supply of the nth liquid mixture and an outlet aperture (23).

18. A process according to claim 17, in which the said one or more reactors (17) are constituted by three reactors in cascade.

19. A continuous process for the production of glycol ether from ethylene oxide and an alcohol, ROH, in which R is a $C_1C_4$alkyl group, characterized in that it includes the steps of;

a) providing n reaction units, where n is whole number from 2 to 100, each constituted by a substantially vertical tubular reactor (11) having an upper part and a lower part and a heat exchanger (14) downstream of the tubular reactor, the tubular reactor (11) having at least one first supply device (13) for supplying the ethylene oxide, at least one second supply device (12) and an outlet aperture (15), the supply devices (12), (13) being located on the inner surface of the upper part of the tubular reactor (11);

b) supplying the reactor (11) of a first of the n reaction units with the alcohol, preheated to a predetermined temperature, by means of the at least one second supply device (12) and with the ethylene oxide through the at least one first supply device (13);

c) reacting the alcohol with the ethylene oxide to obtain a first liquid mixture containing an intermediate product;

d) cooling the first liquid mixture by means of the heat exchanger (14);

e) supplying the reactor (11) of a second of the n reaction units with the first liquid mixture through the at least one second supply device (12) and with the ethylene oxide through the at least one first supply device (13);

f) reacting the first liquid mixture with the oxide to obtain a second liquid mixture;

g) repeating steps d), e) and f) in each of the remaining n-2 reaction units to obtain an nth liquid mixture containing the desired product;

h) cooling and discharging the nth liquid mixture containing the desired product and wherein the chain initiator is selected from the group consisting of alkylphenols, natural and synthetic fatty alcohols and their mixtures, fatty amines and hydrogenated amines, fatty amides, fatty acids, sorbitan esters, monoglycerides and monostearates, pentaerythritol esters, ethylene glycols, propylene glycols, block polymers made from ethylene oxide/propylene oxide, and polymers obtained from random sequences of the latter based on various chain initiators selected from the group consisting of fatty amines, fatty alcohols, glycerine, dipropylene glycol, castor-oil, hydrogenated castor-oil, tallow, mink oil, tall oil and mercaptans.

20. A continuous process for the production of polyadducts of alkylene oxide on a chain initiator which has at least one active hydrogen, characterized in that it comprises the steps of;

a) providing n reaction units, where n is a whole number from 2 to 100, each constituted by a tubular reactor (11), which is substantially vertical and has an upper part and a lower part, and a heat exchanger (14) downstream of the tubular reactor (11), the tubular reactor (11) having at least one first supply device (13) for supplying the alkylene oxide, at least one second supply device (12) and an outlet aperture (15), the devices (12), (13) being located on the inner surface of the upper part of tubular reactor (11);

b) supplying the reactor (11) of a first of the n reaction units with the chain initiator, preheated to a predetermined temperature, through the at least one second supply device (12) and with the alkylene oxide through the at least one first supply device (13);

c) reacting the chain initiator with the alkylene oxide to obtain a first liquid mixture containing an intermediate product;

d) cooling the first liquid mixture by means of the heat exchanger (14);

e) supplying the reactor of a second of the n reaction units with the first liquid mixture by means of the at least one second supply device (12) and with the alkylene oxide by means of the at least one first supply device (13);

f) reacting the first liquid mixture with the oxide to obtain a second liquid mixture;

g) repeating the steps d), e) and f) in each of the remaining n-2 reaction units to obtain an nth liquid mixture containing the desired product;

h) cooling and discharging the nth liquid mixture containing the desired product and the next line wherein the chain located upstream of the first reaction unit to obtain a catalysed chain initiator, said catalyst being selected from the group consisting of hydroxides and alcoholates of alkali metals and hydroxides of alkaline-earth metals.

21. A process according to claim 1, wherein a liquid level in the first of the n reaction units is adjusted so as to provide a constant residence time of chemicals therein.

* * * * *